United States Patent
Yu et al.

(10) Patent No.: US 8,548,210 B2
(45) Date of Patent: Oct. 1, 2013

(54) IMAGE PROCESSING APPARATUS AND IMAGE PROCESSING METHOD

(75) Inventors: Shanshan Yu, Kawasaki (JP); Masayoshi Shimizu, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 163 days.

(21) Appl. No.: 13/064,299

(22) Filed: Mar. 16, 2011

(65) Prior Publication Data
US 2011/0228990 A1 Sep. 22, 2011

Related U.S. Application Data

(63) Continuation of application No. PCT/JP2008/066788, filed on Sep. 17, 2008.

(51) Int. Cl.
G06K 9/00 (2006.01)
(52) U.S. Cl.
USPC ............................................. 382/118
(58) Field of Classification Search
None
See application file for complete search history.

(56) References Cited

U.S. PATENT DOCUMENTS

| | | | |
|---|---|---|---|
| 6,829,384 B2 * | 12/2004 | Schneiderman et al. | 382/154 |
| 7,035,473 B1 * | 4/2006 | Zeng et al. | 382/251 |
| 2006/0204103 A1 * | 9/2006 | Mita et al. | 382/190 |

FOREIGN PATENT DOCUMENTS

| | | |
|---|---|---|
| JP | 05-149888 | 6/1993 |
| JP | 2004-246618 | 9/2004 |

OTHER PUBLICATIONS

Henry Schneiderman et al., "Object Detection Using the Statistics of Parts", International Journal of Computer Vision, 2002, 58 pages.
International Search Report for PCT/JP2008/066788, mailed Oct. 21, 2008.

* cited by examiner

*Primary Examiner* — Samir Ahmed
(74) *Attorney, Agent, or Firm* — Staas & Halsey LLP

(57) ABSTRACT

An image processing apparatus includes an analysis processing unit that quantizes an input image in two levels by replacing an area of the input image where a feature of a subject appears with a first pixel value and replacing an area of the input image where no feature of the subject appears with a second pixel value when the input image is acquired; a storing unit that stores dictionary data including a feature of a plurality of face images quantized by the analysis processing unit; and a face detection processing unit that performs face detection on a detection target image by using the dictionary data read from the storing unit, the detection target data being quantized by the analysis processing unit.

7 Claims, 10 Drawing Sheets

(a)

FIG.2
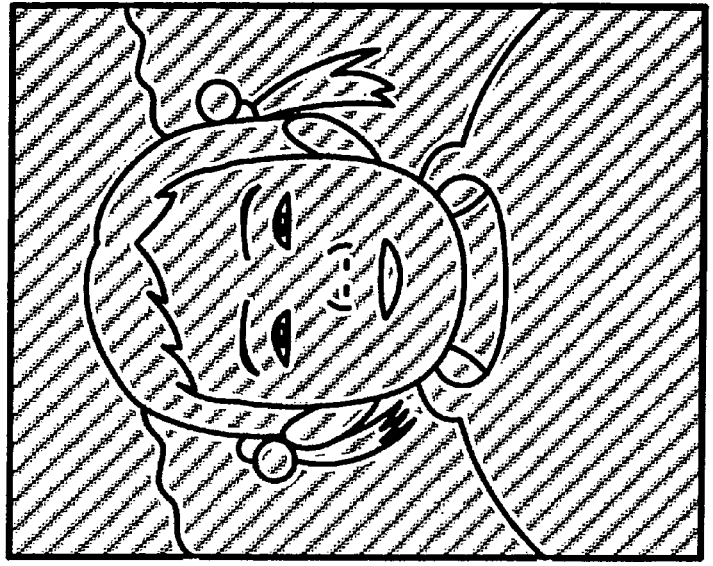
(b)
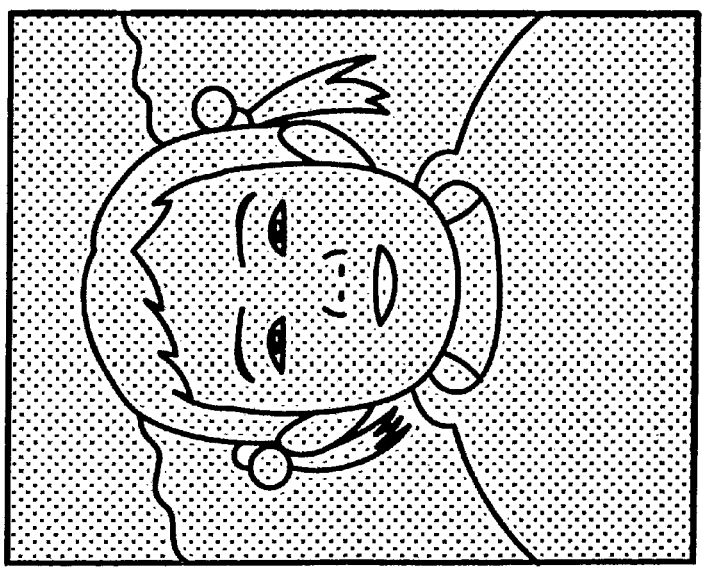
(c)

FIG.2
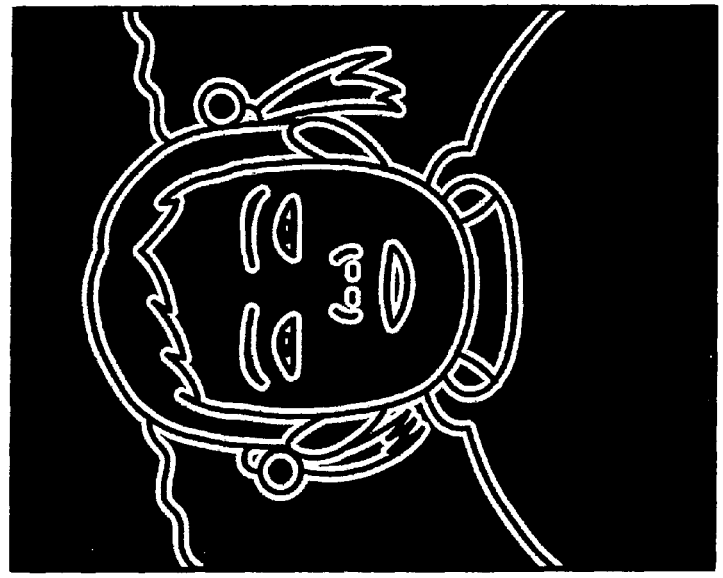
(e)
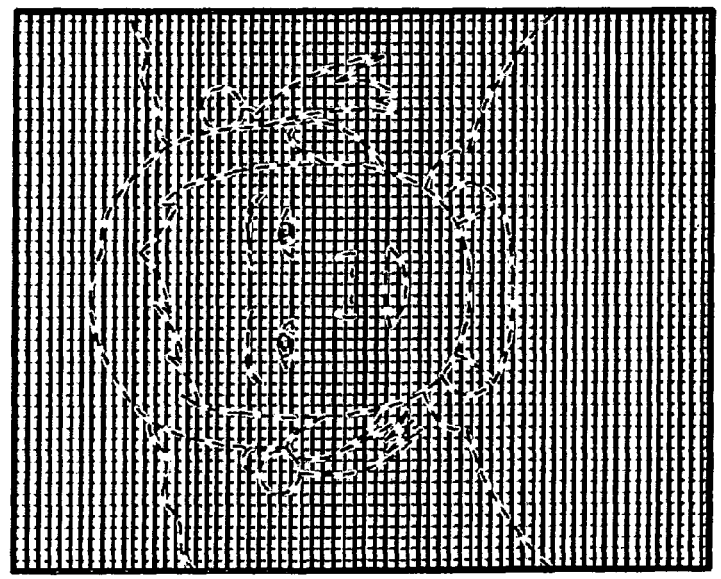
(d)

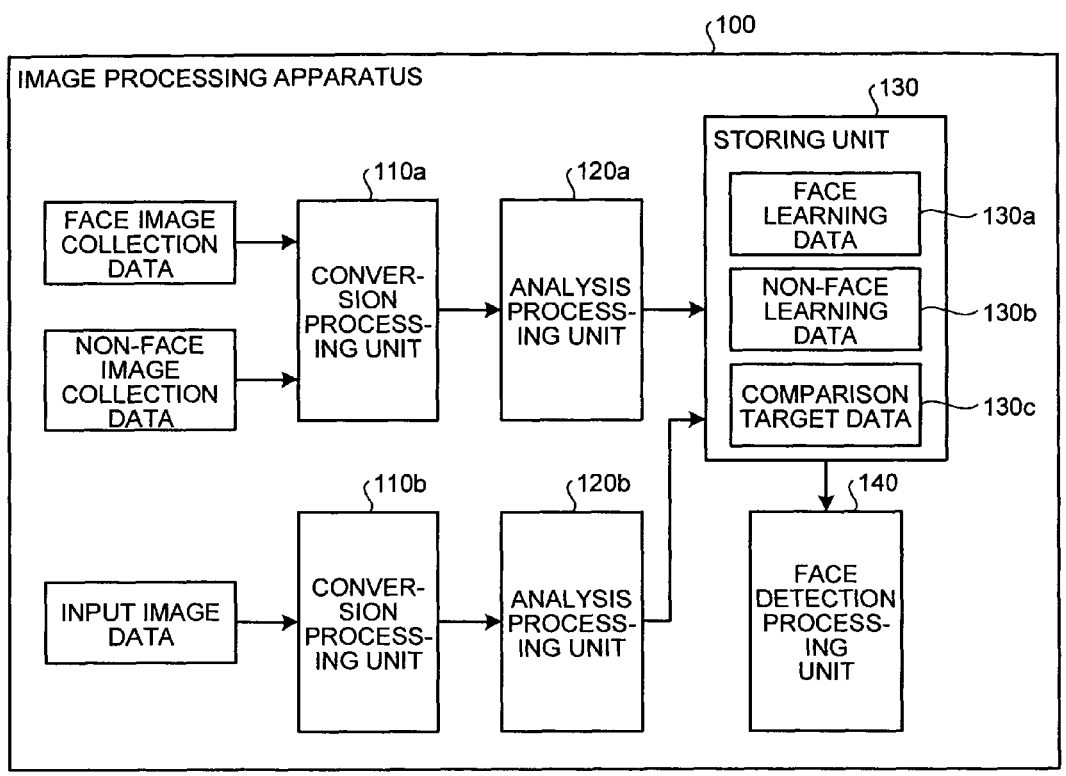

FIG.5

NON-FACE LEARNING DATA

| POSITION INFORMATION | CONVERSION COEFFICIENT VALUE |
|---|---|
| 1, 1 | 1 |
| 1, 2 | 0 |
| 1, 3 | 0 |
| ... | ... |

FIG.6

COMPARISON TARGET DATA

| POSITION INFORMATION | CONVERSION COEFFICIENT VALUE |
|---|---|
| 1, 1 | 1 |
| 1, 2 | 0 |
| 1, 3 | 0 |
| ... | ... |

FIG.7
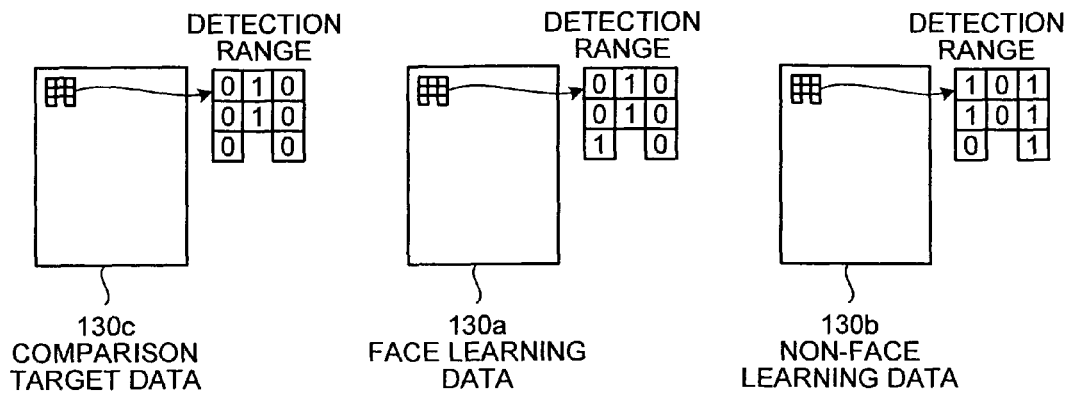
130c
COMPARISON
TARGET DATA
130a
FACE LEARNING
DATA
130b
NON-FACE
LEARNING DATA
FIG.8
COMPARISON RESULT TABLE
| DETECTION RANGE IDENTIFICATION INFORMATION | COMPARISON RESULT |
|---|---|
| 1001 | ○ |
| 1002 | ○ |
| 1003 | × |
| ... | ... |
FIG.9
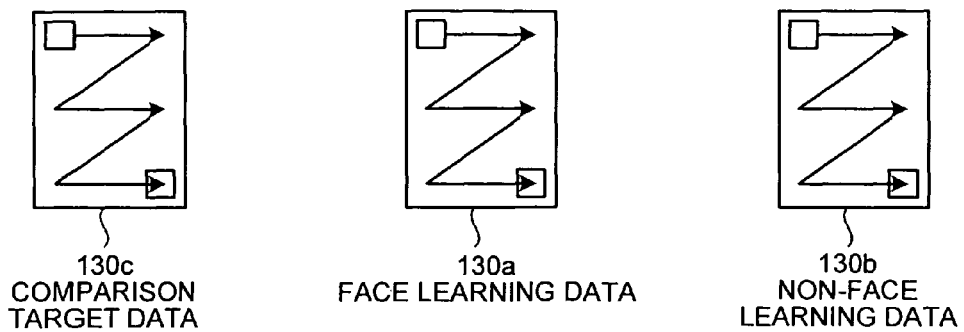
130c
COMPARISON
TARGET DATA
130a
FACE LEARNING DATA
130b
NON-FACE
LEARNING DATA

IMAGE PROCESSING APPARATUS AND IMAGE PROCESSING METHOD

CROSS-REFERENCE TO RELATED APPLICATION

This application is a continuation of International Application No. PCT/JP2008/066788, filed on Sep. 17, 2008, the entire contents of which are incorporated herein by reference.

FIELD

The embodiment discussed herein is directed to an image processing apparatus and an image processing method for quantizing image data.

BACKGROUND

In recent years, research has been made about object detection to detect various types of objects (such as a person's face and a car) from an image that is captured by a camera or the like. The object detection technology includes learning the features of objects to be detected to create learning data in advance, and comparing the created learning data and image data to determine whether the objects to be detected are included in the image.

The image data itself contains an enormous amount of information while the object detection technology has only to determine whether there is an object to be searched for in the image. The image data therefore needs to be reduced to save memory resources by utilizing information quantization techniques.

In some information quantization techniques, the image data is subjected to frequency conversion (wavelet transform) and quantization processing is performed on the basis of the magnitudes of the resulting conversion coefficients (or the magnitudes of differences in pixel value between adjoining pixels) (for example, see H. Schneiderman and T. Kanade, "Object Detection Using the Statistics of Parts", *International Journal of Computer Vision*, 2002, which is referred to as "Schneiderman" hereinafter). According to such quantization processing, the image data is quantized in three levels, which allows a reduction of the area for storing the image data and learning data intended for object detection.

A technique has been known in which gradation difference values are calculated between different combinations of two pixels in target images that are made of grayscale images. The gradation difference values calculated are quantized in predetermined quantization levels for image collation (for example, see Japanese Laid-open Patent Publication No. 2004-246618).

In the foregoing conventional techniques, the image data is quantized to reduce the amount of data of the image data to be processed. With as many as three quantization levels, there has been a problem that the reduction in the amount of data is always optimally achieved.

When performing the quantization processing based on the magnitudes of the conversion coefficients resulting from the frequency conversion of the image data, it is possible to simply quantize the image data in two levels with reference to the median of the conversion coefficients. Such an approach is unrealistic, however, since facial images contain a lot of intermediate values. The quantized image data is less likely to preserve facial features, causing a significant drop in the accuracy of the object detection.

SUMMARY

According to an aspect of an embodiment of the invention, an image processing apparatus includes an analysis processing unit that quantizes an input image in two levels by replacing an area of the input image where a feature of a subject appears with a first pixel value and replacing an area of the input image where no feature of the subject appears with a second pixel value when the input image is acquired; a storing unit that stores dictionary data including a feature of a plurality of face images quantized by the analysis processing unit; and a face detection processing unit that performs face detection on a detection target image by using the dictionary data read from the storing unit, the detection target data being quantized by the analysis processing unit.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 3 is a functional block diagram illustrating the configuration of the image processing apparatus according to the present embodiment;

FIG. 4 is a chart illustrating an example of the data structure of face learning data;

FIG. 5 is a chart illustrating an example of the data structure of non-face learning data;

FIG. 6 is a chart illustrating an example of the data structure of comparison target data;

FIG. 7 is a diagram for explaining an example of the processing of a face detection processing unit;

FIG. 8 is a chart illustrating an example of the data structure of a comparison result table;

FIG. 9 is a diagram for explaining how the detection ranges move;

DESCRIPTION OF EMBODIMENT

A preferred embodiment of the present invention will be explained with reference to accompanying drawings. It should be noted that the present invention is not limited by such an embodiment.

Figure 1:
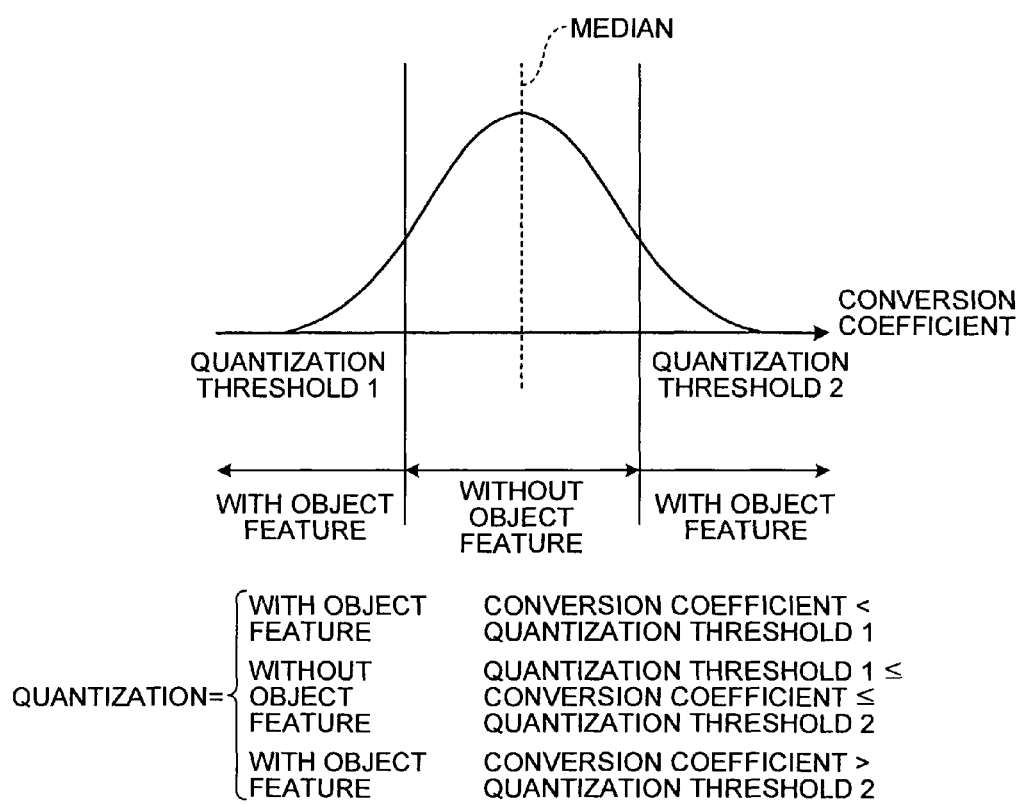
FIG. 1 is a diagram for explaining the outline and characteristics of an image processing apparatus according to the present embodiment.

Initially, an outline and characteristics of the image processing apparatus according to the present embodiment will be described. FIG. 1 is a diagram for explaining the outline and characteristics of the image processing apparatus according to the present embodiment. When quantizing image data to be used for object detection, the image processing apparatus according to the present embodiment quantizes the input image in two levels by replacing areas (pixels) of the input image where a feature of the subject (for example, human face) appears with a first pixel value and replacing areas of the input image where no feature of the subject appears with the first pixel value.

Specifically, as illustrated in FIG. 1, the image processing apparatus performs wavelet transform on the input image before replacing areas of the input image where the conversion coefficient (may be referred to as "gradation feature value") is smaller than quantization threshold 1 or the conversion coefficient is greater than quantization threshold 2 with the first pixel value as feature parts of the subject. The image processing apparatus also replaces areas of the input image where the conversion coefficient is greater than or equal to quantization threshold 1 and smaller than or equal to quantization threshold 2 with a second pixel value as non-feature parts of the subject.

Here, quantization threshold 1 is a threshold value that is smaller than the median of the conversion coefficients and is set by the administrator in advance. Quantization threshold 2 is a threshold value that is greater than the median of the conversion coefficients and is set by the administrator in advance.

Figure 2:
FIG. 2 is a diagram for explaining the effect of the image processing apparatus according to the present embodiment.

FIG. 2 is a diagram for explaining the effect of the image processing apparatus according to the present embodiment. FIG. 2(a) illustrates an original input image, and FIG. 2(b) the input image after wavelet transform. FIG. 2(c) is the input image that is quantized in three levels based on the magnitudes of the conversion coefficients. FIG. 2(d) is the input image that is quantized in two levels based on the magnitudes of the conversion coefficients. FIG. 2(e) is the input image that is quantized by the image processing apparatus according to the present embodiment.

Comparing the input image of FIG. 2(c) and that of FIG. 2(e), the input image of FIG. 2(c) is quantized in three levels while the input image of FIG. 2(e) is quantized in two levels. This allows memory saving. The input image of FIG. 2(d) and that of FIG. 2(e) both are quantized in two levels. As compared to the input image of FIG. 2(d) which is quantized in two levels simply based on the magnitudes of the conversion coefficients, the input image of FIG. 2(e) is quantized in two levels depending on the presence or absence of features of the subject. The input image of FIG. 2(e) is thus capable of optimally preserving facial features to prevent a drop in the accuracy of the object detection.

Next, the configuration of the image processing apparatus 100 according to the embodiment will be described. FIG. 3 is a functional block diagram illustrating the configuration of the image processing apparatus 100 according to the embodiment. As illustrated in FIG. 3, the image processing apparatus 100 includes conversion processing units 110a and 110b, analysis processing units 120a and 120b, a storing unit 130, and a face detection processing unit 140.

The conversion processing unit 110a is a processing unit that acquires face image collection data and non-face image collection data and performs frequency conversion processing (for example, wavelet transform) on the face image collection data and non-face image collection data acquired. The frequency conversion processing on the image data is the same as that of known techniques.

The face image collection data is image data on a collection of face images of various persons. The non-face image collection data is image data on a collection of various images other than face images. The face image collection data and the non-face image collection data have the same size.

The conversion processing unit 110a acquires the face image collection data and the non-face image collection data from an input device, a storage device (not illustrated), and the like. The conversion processing unit 110a outputs the frequency-converted face image collection data and non-face image collection data to the analysis processing unit 120a. In the following description, the frequency-converted face image collection data will be referred to as converted face image collection data. The frequency-converted non-face image collection data will be referred to as converted non-face image collection data.

The conversion processing unit 110b is a processing unit that acquires input image data and performs frequency conversion processing (for example, wavelet transform) on the input image data acquired. The frequency conversion processing on the image data is the same as that of known techniques. The input image data is the image data to be subjected to the object detection. The conversion processing unit 110a acquires the input image data from an input device, a storage device (not illustrated), etc. The conversion processing unit 110b outputs the frequency-converted input image data to the analysis processing unit 120b.

The analysis processing unit 120a is a processing unit that acquires the converted face image collection data and the converted non-face image collection data and then creates face learning data on the basis of the converted face image collection data and creates non-face learning data on the basis of the converted non-face image collection data.

Initially, the processing by which the analysis processing unit 120a creates the face learning data will be concretely described. The analysis processing unit 120a extracts a single piece of image data from the image data included in the converted face image collection data. The image data included in the converted face image collection data is composed of a collection of images illustrating a face in full size, covering most of the vertical length from the head to the chin and most of the horizontal width from ear to ear. It will be understood that the learning data, intended for the detection of various faces, may include not only data on facial shots from right in front, but also data on shots obliquely upward, downward, to the right, and to the left, data on faces with a hat or with glasses, and data on persons of all ages and genders. The analysis processing unit 120a then compares each of the conversion coefficients resulting from the frequency conversion of the single piece of image data with quantization threshold 1 and quantization threshold 2, and replaces the corresponding conversion coefficient value with "0" or "1" for two-level quantization.

The analysis processing unit 120a selects a conversion coefficient in the image data, and replaces the selected conversion coefficient with "1" if the selected conversion coefficient is smaller than quantization threshold 1 or greater than quantization threshold 2.

On the other hand, if the analysis processing unit 120a selects a conversion coefficient in the image data and the selected conversion coefficient is greater than or equal to quantization threshold 1 and is smaller than or equal to quantization threshold 2, the analysis processing unit 120a replaces the selected conversion coefficient with "0". By using the foregoing method, the analysis processing unit 120a replaces all the conversion coefficients of the image data extracted from the converted face image collection data with conversion coefficient values "0" or "1" for two-level quantization.

The analysis processing unit 120a similarly quantizes the rest of the image data included in the converted face image collection data in two levels by the foregoing method. The analysis processing unit 120a then compares the conversion coefficient values of the pieces of quantized image data (the conversion coefficient values corresponding to the same positions in the respective pieces of image data), and creates face learning data on the basis of the frequencies of the conversion coefficient values "0" and "1". For example, suppose that the pieces of image data are compared for the conversion coefficient values at position (x1,y1), and the frequency of the conversion coefficient value "1" is found to be higher than that of the conversion coefficient value "0". In such a case, the conversion coefficient value at position (x1,y1) of the face learning data is set to "1".

FIG. 4 is a chart illustrating an example of the data structure of the face learning data. As illustrated in FIG. 4, the face learning data contains position information and conversion coefficient values in association with each other. It should be noted that the face learning data is not limited to the data structure illustrated in FIG. 4. For example, conversion coefficient values may be stored in association with respective blocks of conversion coefficients (for example, eight conversion coefficients) to be compared for object detection.

Next, the processing by which the analysis processing unit 120a creates the non-face learning data will be described. The analysis processing unit 120a extracts a single piece of image data from the image data included in the converted non-face image collection data. The analysis processing unit 120a then compares each conversion coefficient with quantization threshold 1 and quantization threshold 2, and replaces the corresponding conversion coefficient value with "0" or "1" for two-level quantization.

The analysis processing unit 120a selects a conversion coefficient in the image data, and replaces the selected conversion coefficient value with "1" if the selected conversion coefficient is smaller than quantization threshold 1 or greater than quantization threshold 2.

On the other hand, the analysis processing unit 120a selects a conversion coefficient in the image data, and if the selected conversion coefficient is greater than or equal to quantization threshold 1 and is smaller than or equal to quantization threshold 2, the analysis processing unit 120a replaces the selected conversion coefficient value with "0". By using the foregoing method, the analysis processing unit 120a replaces all the conversion coefficients of the image data extracted from the converted non-face image collection data with conversion coefficient values "0" or "1" for two-level quantization.

The analysis processing unit 120a similarly quantizes the rest of the image data included in the converted non-face image collection data in two levels by the foregoing method. The analysis processing unit 120a then compares the conversion coefficient values of the pieces of quantized image data (the conversion coefficient values corresponding to the same positions in the respective pieces of image data), and creates non-face learning data on the basis of the frequencies of the conversion coefficient values "0" and "1". For example, suppose that the pieces of image data are compared for the conversion coefficient values at position (x1,y1), and the frequency of the conversion coefficient value "1" is found to be higher than that of the conversion coefficient value "0". In such a case, the conversion coefficient value at position (x1, y1) of the non-face learning data is set to "1".

FIG. 5 is a chart illustrating an example of the data structure of the non-face learning data. As illustrated in FIG. 5, the non-face learning data contains position information and conversion coefficient values in association with each other. It should be noted that the non-face learning data is not limited to the data structure illustrated in FIG. 5. For example, conversion coefficient values may be stored in association with respective blocks of conversion coefficients (for example, eight conversion coefficients) to be compared for object detection.

The analysis processing unit 120b is a processing unit that, when acquiring the frequency-converted input image data, quantizes the acquired input image data in two levels. The analysis processing unit 120b outputs the quantized input image data to the storing unit 130. In the following description, the intended area of the face detection, clipped out of the image to be subjected to the detection processing, will be referred to as input image data. The input image data will also be referred to as comparison target data. The input image data is a partial area within the input frame, intended for face image detection.

A concrete description will now be given of the processing by which the analysis processing unit 120b creates the comparison target data, i.e., quantizes the input image data in two levels. The analysis processing unit 120b compares the conversion coefficients of the frequency-converted input image data with quantization threshold 1 and quantization threshold 2, and replaces the conversion coefficient values with "0" or "1" for two-level quantization.

The analysis processing unit 120b selects a conversion coefficient in the input image data, and replaces the selected conversion coefficient value with "1" if the selected conversion coefficient is smaller than quantization threshold 1 or greater than quantization threshold 2.

On the other hand, the analysis processing unit 120b selects a conversion coefficient in the input image data and if the selected conversion coefficient is greater than or equal to quantization threshold 1 and is smaller than or equal to quantization threshold 2, the analysis processing unit 120b replaces the selected conversion coefficient value with "0". By using the foregoing method, the analysis processing unit 120b replaces all the conversion coefficients of the image data extracted from the converted face image collection data with conversion coefficient values "0" or "1". The analysis processing unit 120b thereby quantizes the input image data in two levels to create the comparison target data.

FIG. 6 is a chart illustrating an example of the data structure of the comparison target data. As illustrated in FIG. 6, the comparison target data contains position information and conversion coefficient values in association with each other. It should be noted that the comparison target data is not limited to the data structure illustrated in FIG. 6. For example, conversion coefficient values may be stored in association with respective groups of blocks (for example, eight blocks) to be compared for object detection.

The storing unit 130 is a storing unit that stores the face learning data and the non-face learning data which are output from the analysis processing unit 120a, and the comparison target data which is output from the analysis processing unit 120b.

The face detection processing unit 140 is a processing unit that compares the face learning data 130a, the non-face learning data 130b, and the comparison target data 130c stored in the storing unit 130 to determine whether the input image data contains a face image. The face detection processing unit 140 outputs the result of determination to a host processing unit (not illustrated).

FIG. 7 is a diagram for explaining an example of the processing of the face detection processing unit 140. Specifically, the face detection processing unit 140 sets a detection range, and compares conversion coefficient values included in the detection ranges at the same positions of the face learning data 130a, the non-face learning data 130b, and the comparison target data 130c. The face detection processing unit 140 then determines from the comparison result whether the detection range of the comparison target data is similar to that of the face learning data or that of the non-face learning data, and registers the result of determination in a comparison result table. Such a comparison result table shall be retained by the face detection processing unit 140.

FIG. 8 is a chart illustrating an example of the data structure of the comparison result table. As illustrated in FIG. 8, the comparison result table contains detection range identification information, which identifies the detection range, and comparison results in association with each other. If the comparison between the detection ranges of the face learning data 130a, the non-face learning data 130b, and the comparison target data 130c results in the determination that the comparison target data 130c is similar to the face learning data 130a, the face detection processing unit 140 registers a "circle" in the comparison result. If the comparison target data 130c is determined to be similar to the non-face learning data 130b, the face detection processing unit 140 registers a "cross" in the comparison result.

A specific description will be given with reference to FIG. 7. For example, suppose that the detection range identification information on the detection ranges currently set for the respective pieces of image data 130a to 130c is "1001". The face detection processing unit 140 compares the conversion coefficient values in the detection range of the comparison target data 130c with the conversion coefficient values in the detection range of the face learning data 130a, and finds eight hits.

When comparing the conversion coefficient values in the detection range of the comparison target data 130c with the conversion coefficient values in the detection range of the non-face learning data 130b, the face detection processing unit 140 finds one hit. Since the number of hits is greater with the face learning data 130a than with the non-face learning data 130b, the face detection processing unit 140 sets a "circle" to the comparison result corresponding to the detection range identification information "1001". On the other hand, if the number of hits with the non-face learning data 130b is greater, the face detection processing unit 140 sets a "cross". If the numbers of hits are the same, neither will be set.

The face detection processing unit 140 moves the detection ranges as illustrated in FIG. 9 and registers a "circle" or "cross" into the comparison result of the comparison result table in succession. FIG. 9 is a diagram for explaining how the detection ranges move. When the face detection processing unit 140 compares the conversion coefficient values in the detection ranges, the detection ranges will be located in the same positions on the face learning data 130a, the non-face learning data 130b, and the comparison target data 130c.

After the end of the comparison between the comparison target data 130c, the face learning data 130a, and the non-face learning data 130b, the face detection processing unit 140 consults the comparison result table. If the number of "circles" is greater than that of "crosses", the face detection processing unit 140 determines that the input image includes a face image. On the other hand, if the number of "circles" is smaller than that of "crosses", the face detection processing unit 140 determines that the input image includes a face image. If the number of "circles" and that of "crosses" are the same, the face detection processing unit 140 may determine either that a face image is included or not according to the administrator's setting.

While FIG. 7 illustrates the example where the face detection processing unit 140 compares the conversion coefficient values in units of eight conversion coefficients, this is not restrictive. For example, conversion coefficient values may be compared in units of n conversion coefficients (n is a natural number). The comparison results need not necessarily be saved with respect to each detection range as illustrated in FIG. 8. For example, the numbers of "circles" and "crosses" may be summarized and only the result of summary may be stored in the comparison result table. The face detection technique described in Schneiderman may be used. Such a technique also uses face learning data and non-face learning data with wavelet transform coefficients for detection, and thus is highly consistent with the present invention and is capable of constituting the whole processing in combination with the following procedure.

Figure 10:
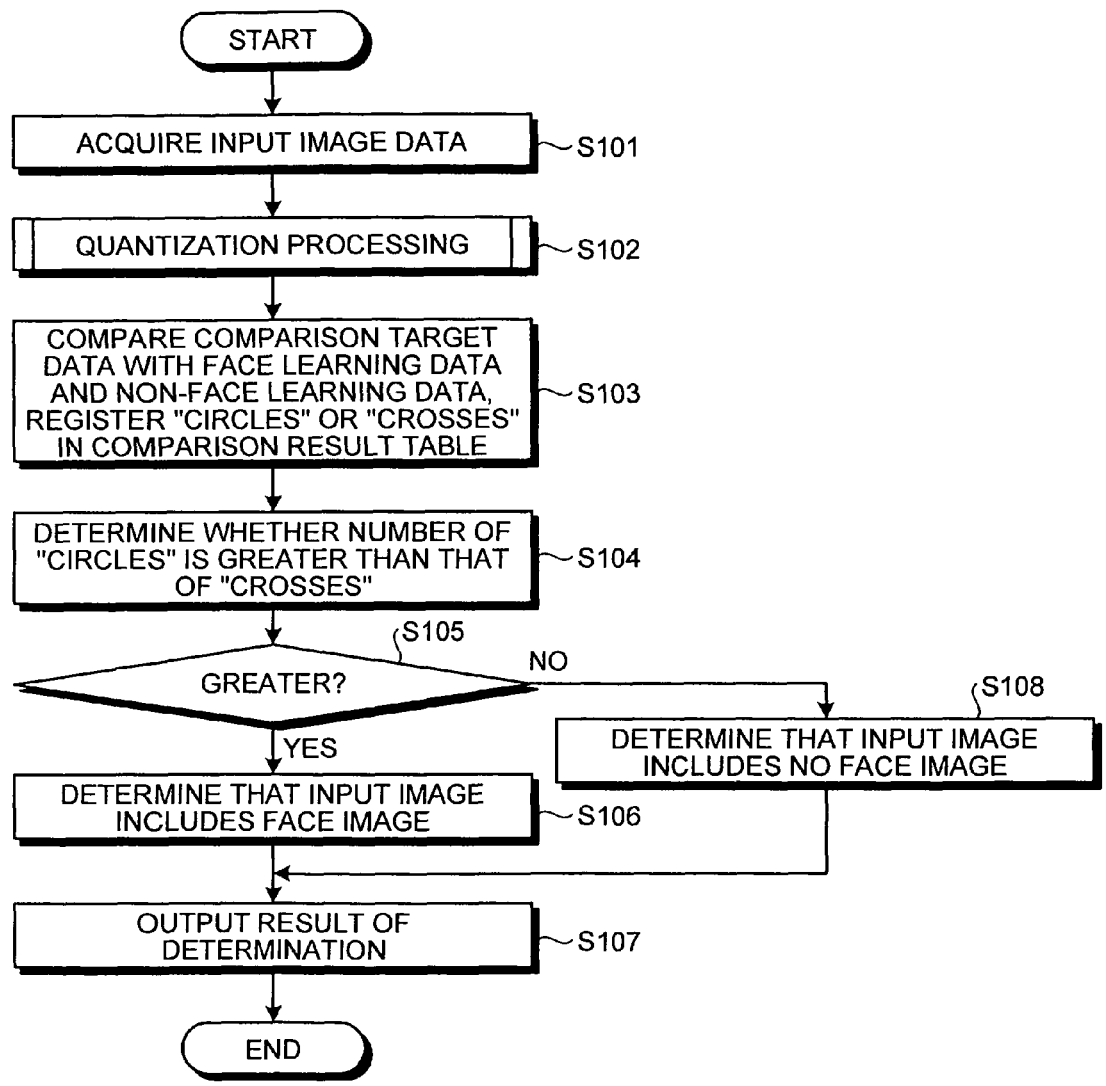
FIG. 10 is a flowchart illustrating the processing procedure of the image processing apparatus according to the present embodiment.

Next, the processing procedure of the image processing apparatus 100 according to the present embodiment will be described. FIG. 10 is a flowchart illustrating the processing procedure of the image processing apparatus 100 according to the present embodiment. As illustrated in FIG. 10, the image processing apparatus 100 acquires input image data (step S101), and performs the quantization processing (step S102).

The image processing apparatus 100 then compares the comparison target data (input image) 130c, which is a partial area in the input frame, with the face learning data 130a and the non-face learning data 130b, and registers "circles" or "crosses" in the comparison result table (step S103). The image processing apparatus 100 determines whether "circles" are more than "crosses" (step S104).

If "circles" are more than "crosses" (step S105, Yes), the image processing apparatus 100 determines that the input image includes a face image (step S106), and outputs the result of determination (step S107). If "circles" are fewer than "crosses" (step S105, No), the image processing apparatus 100 determines that the input image includes no face image (step S108), and moves to step S107.

Figure 11:
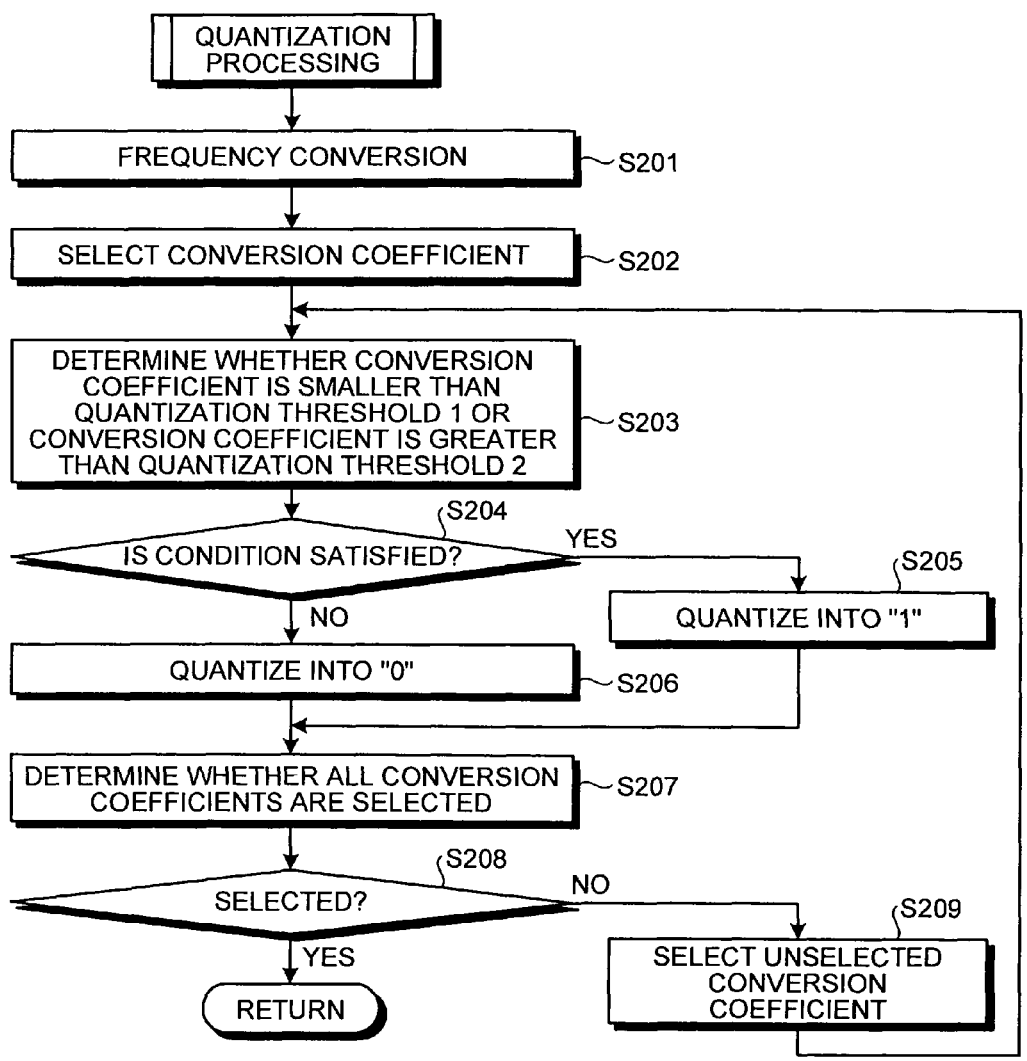
FIG. 11 is a flowchart illustrating the processing procedure of the quantization processing.

Next, the processing procedure of the quantization processing illustrated in step S102 of FIG. 10 will be described. FIG. 11 is a flowchart illustrating the processing procedure of the quantization processing. As illustrated in FIG. 11, the image processing apparatus 100 performs frequency conversion on the input image data (step S201).

The image processing apparatus 100 then selects a conversion coefficient (step S202), and determines whether the selected conversion coefficient is smaller than quantization threshold 1 or the conversion coefficient is greater than quantization threshold 2 (step S203).

If the condition is satisfied, i.e., the conversion coefficient is either smaller than quantization threshold 1 or greater than quantization threshold 2 (step S204, Yes), the image processing apparatus 100 quantizes the corresponding conversion coefficient value into "1" (step S205) and moves to step S207.

On the other hand, if the condition is not satisfied, i.e., the conversion coefficient is greater than or equal to quantization threshold 1 and is smaller than or equal to quantization threshold 2 (step S204, No), the image processing apparatus 100 quantizes the corresponding conversion coefficient value into "0" (step S206). The image processing apparatus 100 determines whether all the conversion coefficients are selected (step S207).

If all the conversion coefficients are selected (step S208, Yes), the image processing apparatus 100 ends the quantization processing. On the other hand, if all the conversion coefficients are not selected (step S208, No), the image processing apparatus 100 selects an unselected conversion coefficient (step S209) and moves to step S203.

As has been described above, when quantizing the image data to be used for object detection (face image collection data, non-face image collection data, and input image data), the image processing apparatus 100 according to the present embodiment replaces areas (pixels) of the image data where a feature of the subject (for example, human face) appears with a first conversion coefficient value and areas of the image data where no feature of the subject appears with a second conversion coefficient value. The image processing apparatus 100 thereby quantizes the image data in two levels to create the face learning data 130*a*, the non-face learning data 130*b*, and the comparison target data 130*c*. This allows optimum reduction of the image data.

The image processing apparatus 100 according to the present embodiment performs the two-level quantization on the basis of the presence or absence of features of the image data. The image processing apparatus 100 can thus prevent the features of the original images from being lost, achieve memory saving, and maintain a high detection rate as with the object detection of the conventional technology.

It should be noted that while the image processing apparatus 100 according to the present embodiment performs frequency conversion (wavelet transform) and quantizes the image data on the basis of the conversion coefficients of the wavelet transform by way of example, this is not restrictive. For example, the image processing apparatus 100 may perform gradient detection or edge detection and perform quantization on the basis of the magnitudes of the gradients or the edge intensities.

More specifically, after gradient detection, the image processing apparatus 100 judges areas where the resulting gradients are smaller than a predetermined value as having no feature, and quantizes such areas into "0". The image processing apparatus 100 judges areas where the gradients are greater than or equal to the predetermined value as having a feature, and quantizes such areas into "1". Alternatively, after edge detection, the image processing apparatus 100 judges areas where the resulting edge intensities are lower than a predetermined value as having no feature, and quantizes such areas into "0". The image processing apparatus 100 judges areas where the edge intensities are higher than or equal to the predetermined value as having a feature, and quantizes such areas into "1".

Now, while the image processing apparatus 100 according to the present embodiment quantizes the image data by comparing the conversion coefficients with quantization threshold 1 and quantization threshold 2, the image data may be quantized simply by comparing the absolute values of the conversion coefficients with quantization threshold 2.

More specifically, the image processing apparatus 100 judges areas where the conversion coefficients have absolute values smaller than quantization threshold 2 as having no feature, and quantizes such areas into "0". The image processing apparatus 100 judges areas where the conversion coefficients have absolute values greater than or equal to quantization threshold 2 as having a feature, and quantizes such areas into "1".

The foregoing quantization methods described in the present embodiment (the one using quantization threshold 1 and quantization threshold 2, and the one using absolute values) can be effectively practiced in combination with publicly-known face detection techniques. For example, the quantization methods may be combined with Schneiderman. In such a case, the three-level quantization (0, 1, 2) of Schneiderman may be modified such that "0 and 2 of the three levels" correspond to "1 of the two levels" and "1 of the three levels" corresponds to "0 of the two levels". According to such a method, it is possible to fully utilize the processing of Schneiderman while significantly reducing the data size proportional to the eighth power of 3 to a size proportional to the eighth power of 2. The foregoing embodiment has dealt with the configuration where the creation of dictionary data and the detection processing are integrated with each other. Embodiments are not limited to such an integral type, and may be configured so that the section that performs up to the creation of dictionary data and the section that performs the detection processing are separated from each other. In such a configuration, the dictionary data created is retained by the device that performs the detection processing.

All or part of processes that have been described in the present embodiment as being automatically performed may be performed manually. All or part of processes that have been described as being manually performed may be automatically performed by publicly known methods. Moreover, the processing procedures, control procedures, specific names, and information including various data and parameters that have been described above or illustrated in the drawings may be arbitrarily modified unless otherwise specified.

The components of the image processing apparatus 100 illustrated in FIG. 3 are functionally conceptual ones, and need not necessarily have the illustrated physical configuration. Various types of processing procedures described in the present embodiments may be implemented by running a prepared program on a computer such as a personal computer or a workstation.

Figure 12:
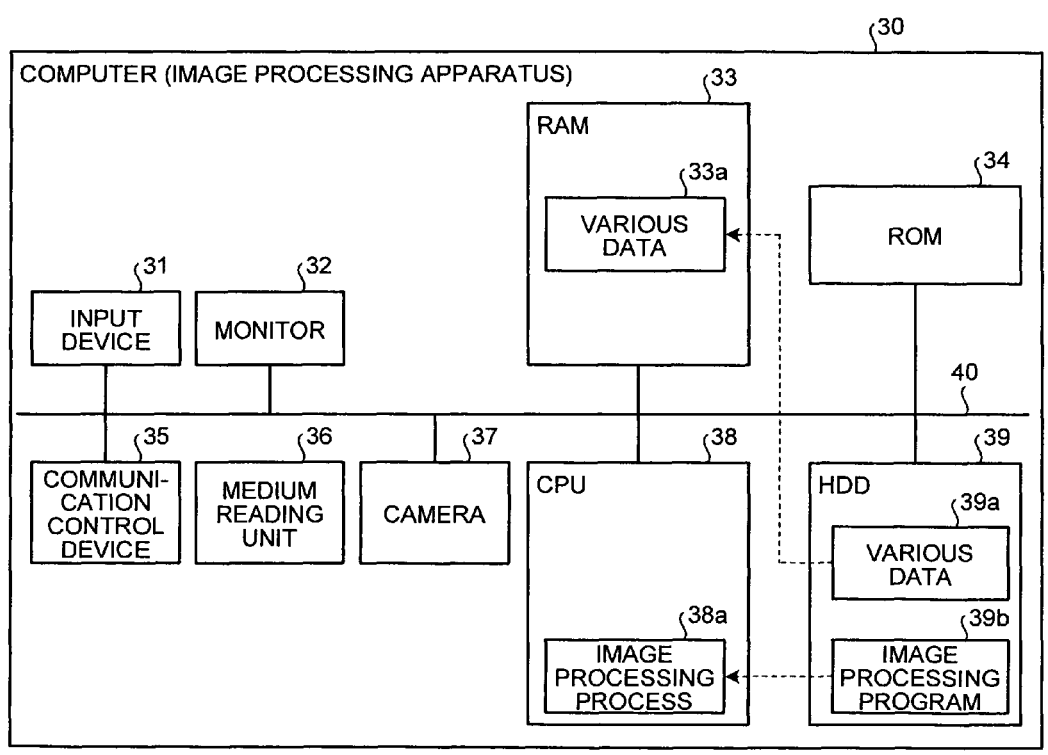
FIG. 12 is a diagram illustrating the hardware configuration of a computer that constitutes the image processing apparatus according to the present embodiment.

FIG. 12 is a diagram illustrating the hardware configuration of a computer that constitutes the image processing apparatus 100 according to the present embodiment. As illustrated in FIG. 12, a computer (image processing apparatus) 30 includes an input device 31, a monitor 32, a random access memory (RAM) 33, a read only memory (ROM) 34, a communication control device 35 which performs communication with other devices over a network, a medium reading device 36 which reads data from a storing medium, a camera 37, a central processing unit (CPU) 38, and a hard disk drive (HDD) 39. Such components are connected with a bus 40.

The HDD 39 contains an image processing program 39*b* which provides the same functions as those of the image processing apparatus 100 described above. The CPU 38 reads and executes the image processing program 39*b*, whereby an image processing process 38*a* is activated.

Here, the image processing process 38*a* corresponds to the conversion processing units 110*a* and 110*b*, the analysis processing units 120*a* and 120*b*, and the face detection processing unit 140 of FIG. 3. The HDD 39 contains various types of data 39*a* corresponding to the information stored in the storing unit 130 of the image processing apparatus 100. The CPU 38 reads the various types of data 39*a* stored in the HDD 39, stores the data into the RAM 33, and performs the image data quantization and object detection by using various types of data 33*a* stored in the RAM 33.

It should be noted that the image processing program 39*b* illustrated in FIG. 12 need not necessarily be stored in the HDD 39 from the beginning. For example, the image processing program 39*b* may previously be stored in a "portable physical medium" such as a flexible disk (FD), CD-ROM, DVD disc, magneto-optical disc, and IC card to be inserted into the computer, a "fixed physical medium" such as a hard disk drive (HDD) which is provided inside or outside the computer, or "another computer (or server)" which is connected to the computer through a public circuit, the Internet, LAN, WAN, or the like, so that the computer reads the image processing program 39*b* from such a medium for execution.

According to an aspect of the image processing apparatus, the two-level quantization is performed on the basis of the presence or absence of features of the image data. This can prevent the features of the original images from being lost, achieve memory saving, and maintain a high detection rate as with the object detection of the conventional technology.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An image processing apparatus comprising:
    a conversion processing unit that extracts a gradation feature value from inside an input image when the input image is acquired;
    an analysis processing unit that quantizes the input image in two levels based on the gradation feature value in the input image, a first threshold value smaller than a median, and a second threshold value greater than the median by replacing areas of the input image where the gradation feature value is smaller than the first threshold value and where the gradation feature value is greater than the second threshold value with a first pixel value and replacing remaining areas of the input image with a second pixel value;
    a storing unit that stores dictionary data including a feature of a plurality of face images quantized by the analysis processing unit; and
    a face detection processing unit that performs face detection on a detection target image by using the dictionary data read from the storing unit, the detection target data being quantized by the analysis processing unit, wherein
    the conversion processing unit performs frequency conversion on the input image and extracts a magnitude of a frequency component as the gradation feature value, and
    wherein the analysis processing unit quantizes the input image in two levels based on an absolute value of the gradient feature value in the input image and the second threshold by replacing an area of the input image where the gradient feature value has an absolute value greater than the second threshold with the first pixel value and replacing remaining areas of the input image with the second pixel value.

2. The image processing apparatus according to claim 1, wherein the conversion processing unit performs gradient calculation or edge detection on the input image and extracts a magnitude of a gradient or an edge intensity as the gradation feature value.

3. The image processing apparatus according to claim 1, wherein the conversion processing unit uses wavelet transform as the frequency conversion.

4. An image processing method performed in an image processing apparatus, comprising:
    extracting a gradation feature value from inside an input image when the input image is acquired;
    quantizing the input image in two levels based on the gradation feature value in the input image, a first threshold value smaller than a median, and a second threshold value greater than the median by replacing areas of the input image where the gradation feature value is smaller than the first threshold value and where the gradation feature value is greater than the second threshold value with a first pixel value and replacing remaining areas of the input image with a second pixel value;
    storing dictionary data including a feature of a plurality of face images quantized at the quantizing; and
    performing face detection on a detection target image by using the dictionary data read from the storing unit, the detection target data being quantized at the quantizing, wherein
    the conversion processing unit performs frequency conversion on the input image and extracts a magnitude of a frequency component as the gradation feature value, and
    wherein the analysis processing unit quantizes the input image in two levels based on an absolute value of the gradient feature value in the input image and the second threshold by replacing an area of the input image where the gradient feature value has an absolute value greater than the second threshold with the first pixel value and replacing remaining areas of the input image with the second pixel value.

5. The image processing method according to claim 4, wherein the extracting includes performing gradient calculation or edge detection on the input image and extracting a magnitude of a gradient or an edge intensity as the gradation feature value.

6. A computer-readable, non-transitory medium storing a program causing a computer to execute a process comprising:
    extracting a gradation feature value from inside an input image when the input image is acquired;
    quantizing the input image in two levels based on the gradation feature value in the input image, a first threshold value smaller than a median, and a second threshold value greater than the median by replacing areas of the input image where the gradation feature value is smaller than the first threshold value and where the gradation feature value is greater than the second threshold value with a first pixel value and replacing remaining areas of the input image with a second pixel value;
    storing dictionary data including a feature of a plurality of face images quantized at the quantizing; and
    performing face detection on a detection target image by using the dictionary data read from the storing unit, the detection target data being quantized at the quantizing, wherein
    the conversion processing unit performs frequency conversion on the input image and extracts a magnitude of a frequency component as the gradation feature value, and
    wherein the analysis processing unit quantizes the input image in two levels based on an absolute value of the gradient feature value in the input image and the second threshold by replacing an area of the input image where the gradient feature value has an absolute value greater than the second threshold with the first pixel value and replacing remaining areas of the input image with the second pixel value.

7. The computer-readable, non-transitory medium according to claim 6, wherein the extracting includes performing gradient calculation or edge detection on the input image and extracting a magnitude of a gradient or an edge intensity as the gradation feature value.

* * * * *